US012164371B2

(12) United States Patent
Makaram et al.

(10) Patent No.: US 12,164,371 B2
(45) Date of Patent: Dec. 10, 2024

(54) SYSTEM, APPARATUS AND METHOD FOR PROVIDING PROTECTION AGAINST SILENT DATA CORRUPTION IN A LINK

(71) Applicant: Intel Corporation, Santa Clara, CA (US)

(72) Inventors: Raghunandan Makaram, Northborough, MA (US); Kirk S. Yap, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 685 days.

(21) Appl. No.: 17/111,905

(22) Filed: Dec. 4, 2020

(65) Prior Publication Data

US 2021/0089388 A1 Mar. 25, 2021

Related U.S. Application Data

(60) Provisional application No. 63/051,598, filed on Jul. 14, 2020.

(51) Int. Cl.
*G06F 11/10* (2006.01)
*H04L 9/32* (2006.01)
*H04L 69/22* (2022.01)

(52) U.S. Cl.
CPC ........ *G06F 11/1004* (2013.01); *H04L 9/3242* (2013.01); *H04L 69/22* (2013.01); *H04L 2209/34* (2013.01)

(58) Field of Classification Search
CPC .............. G06F 11/1004; G06F 21/64; H04L 2209/34; H04L 69/22; H04L 9/0643; H04L 9/3242
See application file for complete search history.

(56) References Cited

U.S. PATENT DOCUMENTS

| 7,885,405 B1* | 2/2011 | Bong | H04L 9/0637 |
| | | | 713/153 |
| 2004/0017913 A1* | 1/2004 | Hawkes | H04L 9/0637 |
| | | | 380/37 |

(Continued)

OTHER PUBLICATIONS

X. Li, L. Jin, Z. Zhong and Y. Lou, "A Physical-Layer Message Encryption and Authentication Scheme," 2018 IEEE 4th International Conference on Computer and Communications (ICCC), Chengdu, China, 2018, pp. 1893-1898, doi: 10.1109/CompComm. 2018.8780742. (Year: 2018).*

(Continued)

*Primary Examiner* — Albert Decady
*Assistant Examiner* — Enamul M Kabir
(74) *Attorney, Agent, or Firm* — Eversheds Sutherland (US) LLP

(57) ABSTRACT

In one embodiment, an apparatus includes: an integrity circuit to receive data and generate a protection code based at least in part on the data; a cryptographic circuit coupled to the integrity circuit to encrypt the data into encrypted data and encrypt the protection code into an encrypted protection code; a message authentication code (MAC) circuit coupled to the cryptographic circuit to compute a MAC comprising a tag using header information, the encrypted data, and the encrypted protection code; and an output circuit to send the header information, the encrypted data, and the tag to a receiver via a link. Other embodiments are described and claimed.

19 Claims, 14 Drawing Sheets

(56) References Cited

U.S. PATENT DOCUMENTS

| | | | |
|---|---|---|---|
| 2004/0019782 A1* | 1/2004 | Hawkes | H04L 9/3236 380/37 |
| 2004/0019783 A1* | 1/2004 | Hawkes | H04L 9/0637 380/37 |
| 2005/0185790 A1* | 8/2005 | Le Quere | G06F 21/72 380/28 |
| 2005/0188194 A1* | 8/2005 | Fascenda | H04W 12/069 713/155 |
| 2006/0093148 A1* | 5/2006 | Ko | H04W 12/033 380/270 |
| 2009/0185677 A1* | 7/2009 | Bugbee | H04L 9/0841 380/28 |
| 2017/0061832 A1* | 3/2017 | Ghosh | H04L 9/0631 |
| 2017/0213054 A1* | 7/2017 | Chen | H04L 9/083 |
| 2017/0302454 A1* | 10/2017 | Jacquin | H04L 9/0643 |
| 2018/0091483 A1* | 3/2018 | Eiriksson | G06F 21/602 |
| 2018/0345153 A1* | 12/2018 | Irwin, Jr. | A63F 13/80 |
| 2019/0004990 A1* | 1/2019 | Van Doren | G06F 13/4234 |
| 2019/0042796 A1* | 2/2019 | Von Bokern | G06F 9/45558 |
| 2019/0305797 A1 | 10/2019 | Peffers et al. | |
| 2019/0306134 A1* | 10/2019 | Shanbhogue | G06F 21/64 |
| 2019/0384733 A1* | 12/2019 | Jen | G06F 1/3278 |
| 2020/0111095 A1* | 4/2020 | Osborn | H04L 9/3242 |
| 2020/0151362 A1* | 5/2020 | Harriman | G06F 21/85 |
| 2020/0322126 A1* | 10/2020 | Driscoll | H04L 1/0041 |
| 2020/0328879 A1* | 10/2020 | Makaram | G06F 21/6209 |
| 2022/0191006 A1* | 6/2022 | Zeh | H04W 4/40 |
| 2023/0037778 A1* | 2/2023 | Colucci | H04L 67/12 |

OTHER PUBLICATIONS

Intel Corporation, "Compute Express Link, Specification, Mar. 2019, Revision: 1.0," Mar. 2019, 206 pages.

* cited by examiner

SYSTEM, APPARATUS AND METHOD FOR PROVIDING PROTECTION AGAINST SILENT DATA CORRUPTION IN A LINK

TECHNICAL FIELD

Embodiments relate to providing data integrity and encryption for link communications.

BACKGROUND

Modern computing systems handle high levels of communications and data transfers. As speeds increase and ever more circuitry is included in integrated circuits, there exists a concern of data integrity and protection against silent data corruption (SDC). Such issues can be exacerbated with cloud scale deployment and data processing at very high rates.

Operations used to provide integrity and data encryption (IDE) for data transmitted across a link are of particular concern since a single bit error can result in an avalanche of bit errors (e.g., 50% bits could flip). Current approaches have drawbacks in terms of performance/latency penalty, an increase in duplication of encryption circuitry, and/or power consumption concerns, among others.

DETAILED DESCRIPTION

In various embodiments, multiple components in one or more computing systems may be provided with both error detection (and/or correction) protection and cryptographic protection in a highly efficient and low overhead manner. Embodiments may combine error protection information (e.g., cyclic redundancy checksum (CRC) or error correction coding (ECC)) that provides error detection/correction with a link IDE message authentication code (MAC) In this way, data integrity may be guaranteed to deliver high levels of silent data corruption (SDC) protection at low cost.

At a high level, a transmitter generates these protection bits on plain text (pre-encrypted) data, encrypts the protection bits and computes a link IDE MAC on the encrypted data. This operation ensures security properties are maintained and there is no data leakage. Note however that in embodiments, the encrypted protection bits themselves are not transmitted on the link. In turn, a receiver regenerates the protection bits based on the plain text and then uses them to verify the MAC. As a result, a high level of error detection is realized. And in some cases, error correction is possible in embodiments that implement ECC technology.

Still further, embodiments may realize this protection with no bandwidth impact and minimal latency impact on the link. Link IDE in an embodiment may provide confidentiality, integrity and replay protection for data transiting a link via physical attacks on the link. An adversary is assumed to have the ability to examine data intended to be confidential, modify data or protocol metadata, record and replay recorded transactions, reorder and/or delete transactions, inject transactions including requests/data or non-data responses, replace trusted devices with an untrusted one, and/or remove a trusted device and access it from a system that is under an adversary's control. Embodiments may provide protection against such attacks.

Figure 1:
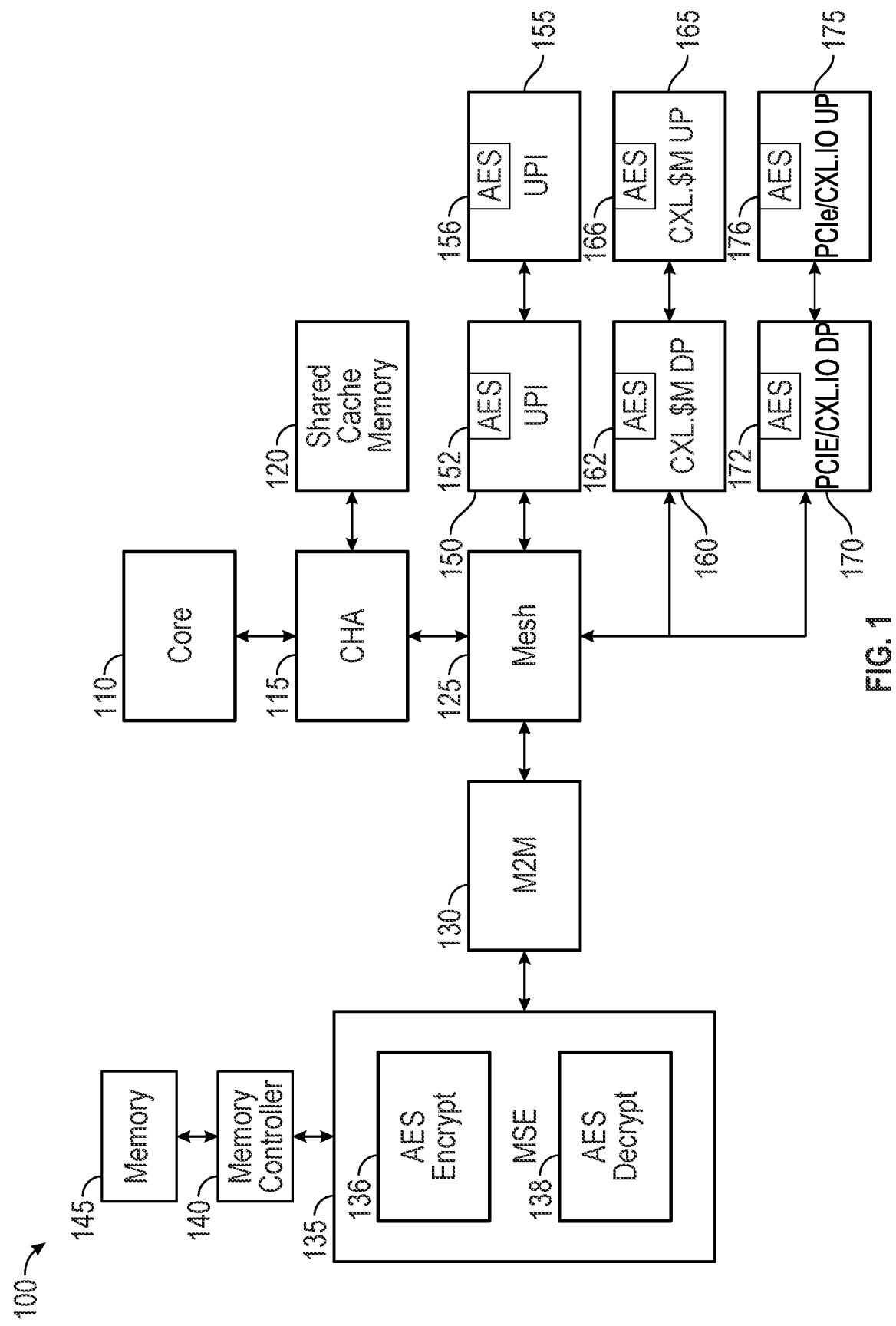
FIG. 1 is a block diagram of a system in accordance with an embodiment.

Referring now to FIG. 1, shown is a block diagram of a system in accordance with an embodiment. As shown in FIG. 1, system 100 may be all or portion of a given computing system, which may range from a client device such as a portable client device, e.g., smartphone, tablet computer or so forth to a larger client device such as a desktop computer, to an enterprise computing system such as a server system. The components shown in FIG. 1 may be implemented in one or more integrated circuits. For example, in some cases at least much of the circuitry shown may be implemented in a single package, such as a system on chip (SoC) or other multicore processor such as a server processor. In other cases a variety of different integrated circuits may couple together via interconnects.

In the high level of FIG. 1, different interconnects couple together the various devices. With embodiments herein, information may be communicated along interconnects with error detection and/or error correction capabilities. Still further, at least some interconnects may communicate information in an encrypted manner. With embodiments herein, end-to-end data protection of plain text information may be realized, such that errors that occur in cryptographic operations can be detected.

In high level shown in FIG. 1, a representative core 110 is shown. Such core may be an in-order core or an out-of-order core. Understand while a single core is shown for ease of illustration, multiple such cores may be present. As shown, core 110 couples to a caching home agent (CHA) 115. Communications between core 110 and CHA 115 may be protected by parity, in an embodiment. In turn, CHA 115 couples to a shared cache memory 120, which in an embodiment may be implemented as a last level cache (LLC). In an embodiment, communications between CHA 115 and LLC 120 may be protected with ECC. In turn, parity-protected communications also may occur between CHA 115 and a mesh 125, which may couple various elements together. As such, information communicated via mesh 125 may be protected with parity, as it is communicated to a M2M 130, an Intel® Ultra Path Interconnect (UPI) interface circuit 150, a Compute Express Link (CXL) cache memory downlink port 160, and a Peripheral Component Interconnect Express (PCIe)/CXL.IO downlink port 170. Each of these devices may include a corresponding cryptographic circuits 152, 162, 172. As shown, encryption may be performed in accordance with a given Advanced Encryption Standard (AES) crypto algorithm. Of course in other embodiments, other crypto algorithm choices are also possible, especially for other link protocols. In addition, either within these cryptographic circuits or as other circuitry within these devices, link IDE circuitry may be present to realize by data protection and encryption as described herein.

Still referring to FIG. 1, UPI interface circuit 155, and uplink ports 165, 175 may similarly include corresponding cryptographic circuitry 156, 166, and 176 (and link IDE circuitry). While shown with these representative devices and links, understand that other devices may be present in a system that are coupled by other communication protocols such as DMI, PECI, I3C, MIPI, and USB.

With embodiments herein, any errors occurring in such circuitry may be detected and possibly corrected with IDE techniques as described herein. Thus communications between interface circuits 150, 160, 170 and corresponding UPI circuit 155, and uplink ports 165, 175 may be protected both cryptographically and with data integrity. At the same time, as will be described herein, data protection coding, such as checksums, error correction coding or so forth, is not communicated on corresponding links between these devices. To this end, the various components in FIG. 1 may include link IDE circuitry as described herein.

Still with reference to FIG. 1, M2M 130 may communicate parity-protected information with a memory security engine (MSE) 135 which may perform encryption operations. MSE 135 may include corresponding AES cryptographic circuits 136/138. As further illustrated, encrypted information may be stored in a memory 145 via a memory controller 140. In an example, memory 145 is protected using a different mechanism, e.g., using a memory encryption engine (MKTME).

As one example of communications within system 100, consider the case where core 110 writes to a CXL memory device that is attached via CXL links. For this situation, the core write request and data are parity protected over the link coupled to CHA 115. In turn, the data is stored in cache memory 120, where it is ECC protected. The data is then moved over mesh 125 to CXL downlink port 160 over an internal mesh where it is parity protected. When the data transits across the CXL link, it is CRC protected. Once the data reaches the downstream device, there are similar data protections schemes until the data is written to the memory device. In memory, the data may be protected using ECC. While these data paths are all protected, without an embodiment there would still be exposure to errors that happen in the crypto engines (e.g., AES circuits 162, 166) where data transformation occurs. That is, without an embodiment, bit flips that happen in the process of generating cipher text would not be detected. Instead, with an embodiment such errors may be detected and possibly corrected.

Understand while shown at this high level in the embodiment of FIG. 1, many variations and alternatives are possible. Further, in the high level shown in FIG. 1, details of interface circuitry present in the various devices is not shown. Understand that with embodiments herein, such interface circuitry may be present and may include link IDE circuitry to provide end-to-end data protection as described herein.

Figure 2:
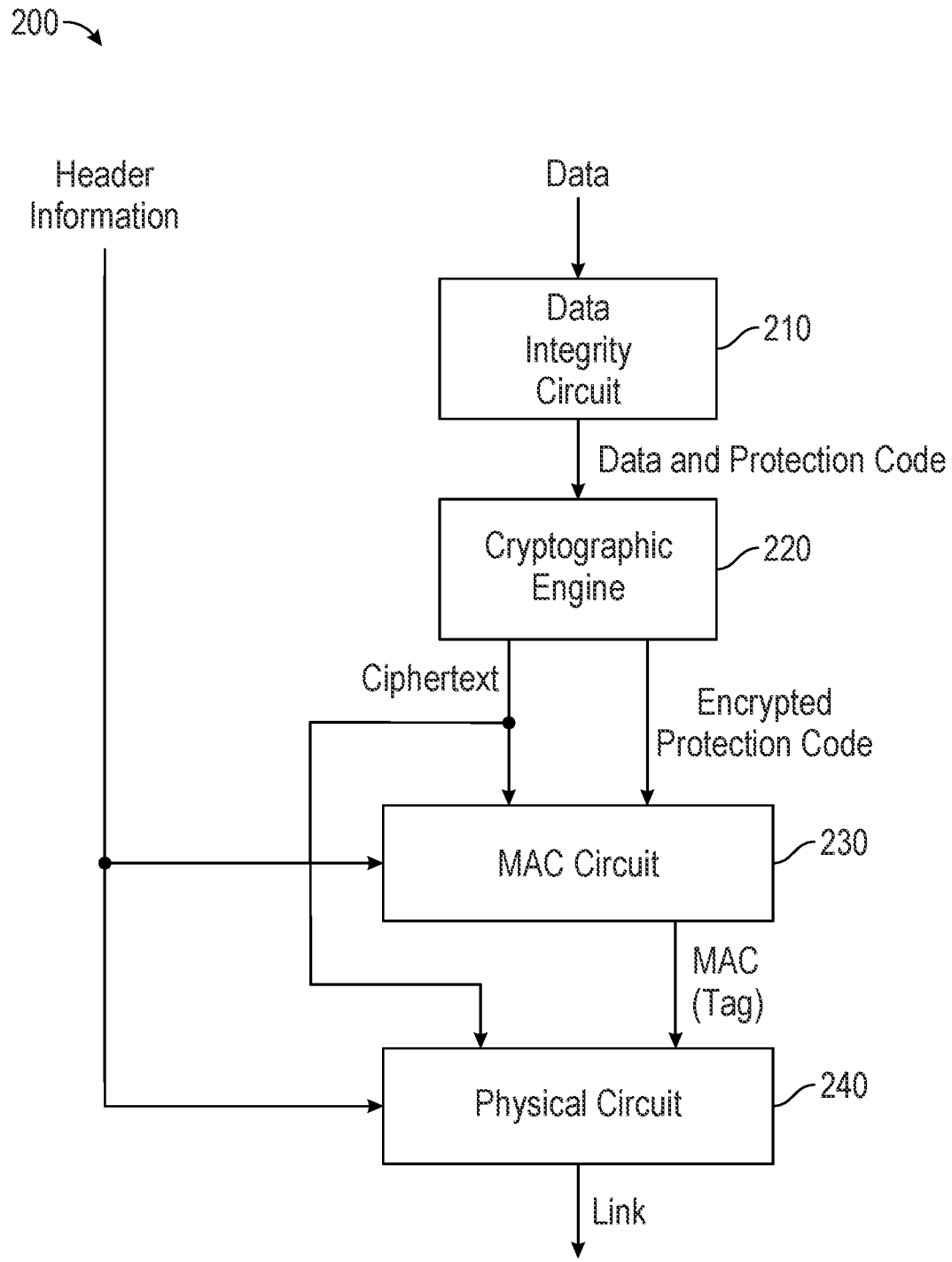
FIG. 2 is a block diagram of an IDE circuit in accordance with an embodiment.

Referring now to FIG. 2, shown is a block diagram of an IDE circuit in accordance with an embodiment. As shown in FIG. 2, IDE circuit 200 may be present within interface circuitry of various devices in a computing system. More specifically, IDE circuit 200 of FIG. 2 shows circuitry present in a transmitter. While shown as a dedicated circuit, understand that in some implementations at least portions of this interface circuitry also may be configured to perform receiver-based IDE operations.

As shown, incoming data is received in a data integrity circuit 210. Such data may take different forms and may include instructions, requests, data information and so forth. In any case, understand that this incoming data is received in an unencrypted manner. In embodiments, data integrity circuit 210 may provide data integrity by way of error detection and/or error correction coding. More generically, data integrity circuit 210 may generate a code which may be a parity code, an error correction code or so forth. Understand that the protection code is generated based on the received plain text. Accordingly, data integrity circuit 210 outputs data and the protection code, both in plain text form.

As further illustrated in FIG. 2, this information is provided to a cryptographic engine 220. Cryptographic engine 220 may encrypt this information according to an encryption technique, e.g., a given AES encryption technique. In one embodiment, encryption may be performed where the data and appended protection code each may be separately encrypted. Accordingly, the plain text is encrypted into cipher text and the protection code is encrypted into an encrypted protection code.

Next, the cipher text and encrypted protection code are provided to a message authentication code (MAC) circuit 230, which further receives header information. From all of these received inputs, MAC circuit 230 may generate a MAC, also referred to herein as a tag. In one embodiment a 96-bit tag may be generated from 300 bytes of cipher text, a 20 byte header and a 4 byte protection code.

As shown, MAC circuit 230 provides the tag to a physical circuit 240, which further receives the cipher text and unencrypted header information. Note that the encrypted protection code itself is not provided to physical circuit 240. Such arrangement may thus save on information to be communicated on a link to which physical circuit 240 couples. In different implementations physical circuit 240 may include at least some portions of protocol layer circuitry, data link layer circuitry and physical layer circuitry. As such, physical circuit 240 prepares messages for communication via a link, which may be a wired or wireless link in different implementations. In the example of a CXL link, physical circuit 240 may generate individual flits, each of 528 bits, to be sent to a receiver. Understand while shown at this high level in the embodiment of FIG. 2, many variations are possible.

Figure 3:
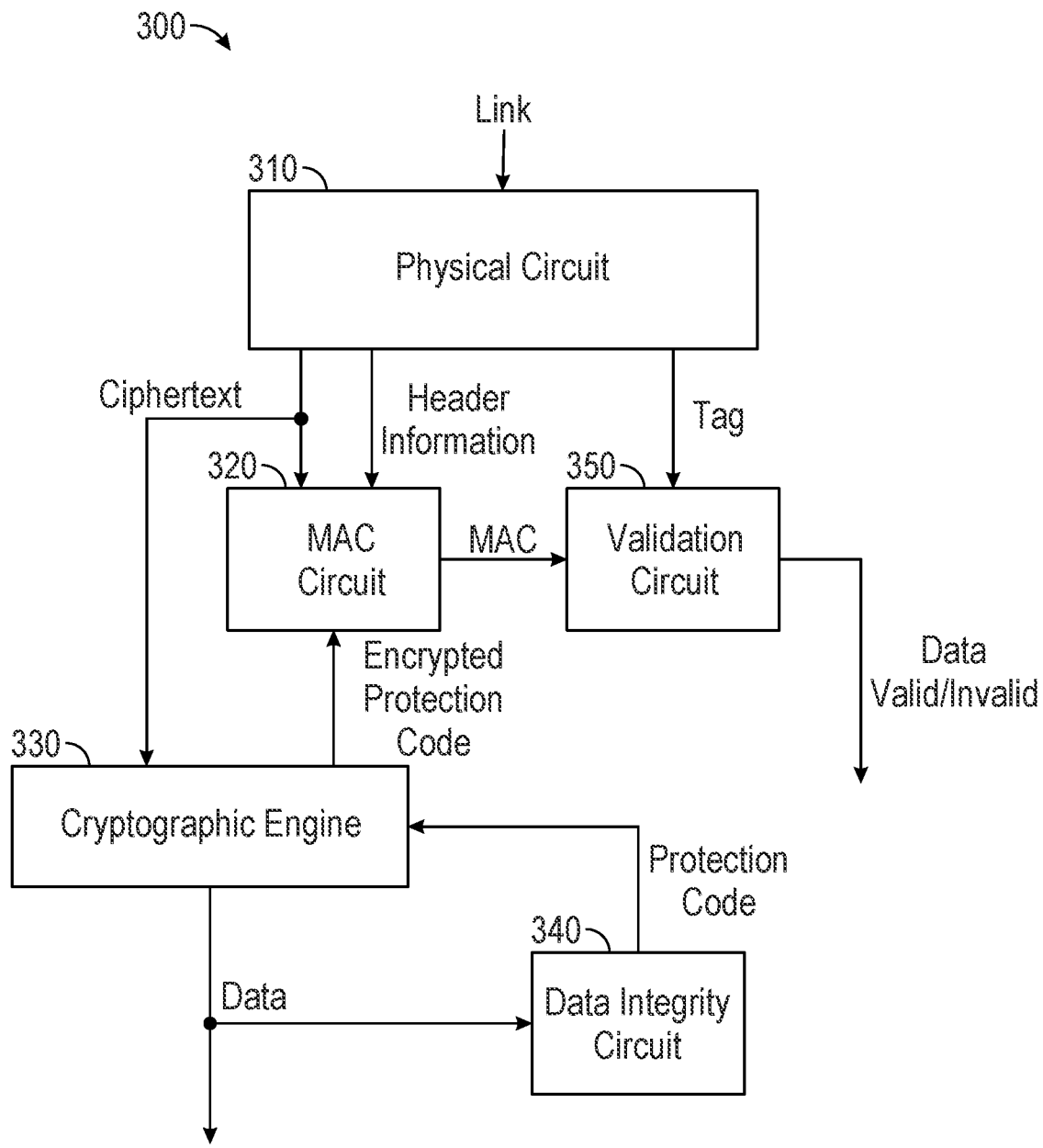
FIG. 3 is a block diagram of an IDE circuit in accordance with another embodiment.

Referring now to FIG. 3, shown is a block diagram of another IDE circuit in accordance with an embodiment. As shown in FIG. 3, IDE circuit 300 may be present within interface circuitry of various devices in a computing system. More specifically, IDE circuit 300 of FIG. 3 shows circuitry present in a receiver. While shown as a dedicated circuit, understand that in some implementations at least portions of this interface circuitry also may be configured to perform transmitter-based IDE operations.

As shown, incoming data is received from a link in a physical circuit 310. Such data may include header information, encrypted data and a tag of a MAC generated in a transmitter. As shown, physical circuit 310 provides cipher text to a MAC circuit 320 and a cryptographic engine 330. Physical circuit 310 also provides the tag to a validation circuit 350.

Cryptographic engine 330 may decrypt the cipher text, e.g., via an AES technique, to generate plain text, which it provides to a data integrity circuit 340. In embodiments, data integrity circuit 340 may provide data integrity by way of error detection and/or error correction coding, such as generating a plain text CRC or other protection code that is provided to cryptographic engine 330. In turn, cryptographic engine 330 encrypts this protection code and provides to MAC circuit 320 for use in generating the MAC.

As further illustrated in FIG. 3, MAC circuit 320 generates a MAC using the cipher text, the encrypted CRC and header information, and provides it to validation circuit 350. In embodiments, validation circuit 350 may be configured to compare the received tag to the generated MAC to determine whether the values match. If so, the received data is indicated to be valid. Otherwise, an indication of invalid data can be sent. Different operations may be performed responsive to invalid data. In cases where error correction coding is provided, the error may be attempted to be corrected in error correction circuitry (not shown for ease of illustration in FIG. 3). Ultimately, an error message can be sent back to the transmitter via the link to request a replay of the message. Of course other error handling operations may be performed in other embodiments. For example, one error handling scheme may flag such errors as fatal errors that triggers a system controller or software reset of the link (or system) to recover from the error. Replay may also be possible. More contained error correction is possible when the error is in the cipher text received (that is errors that were not detectable by a link level protection scheme such as link CRC).

Figure 4:
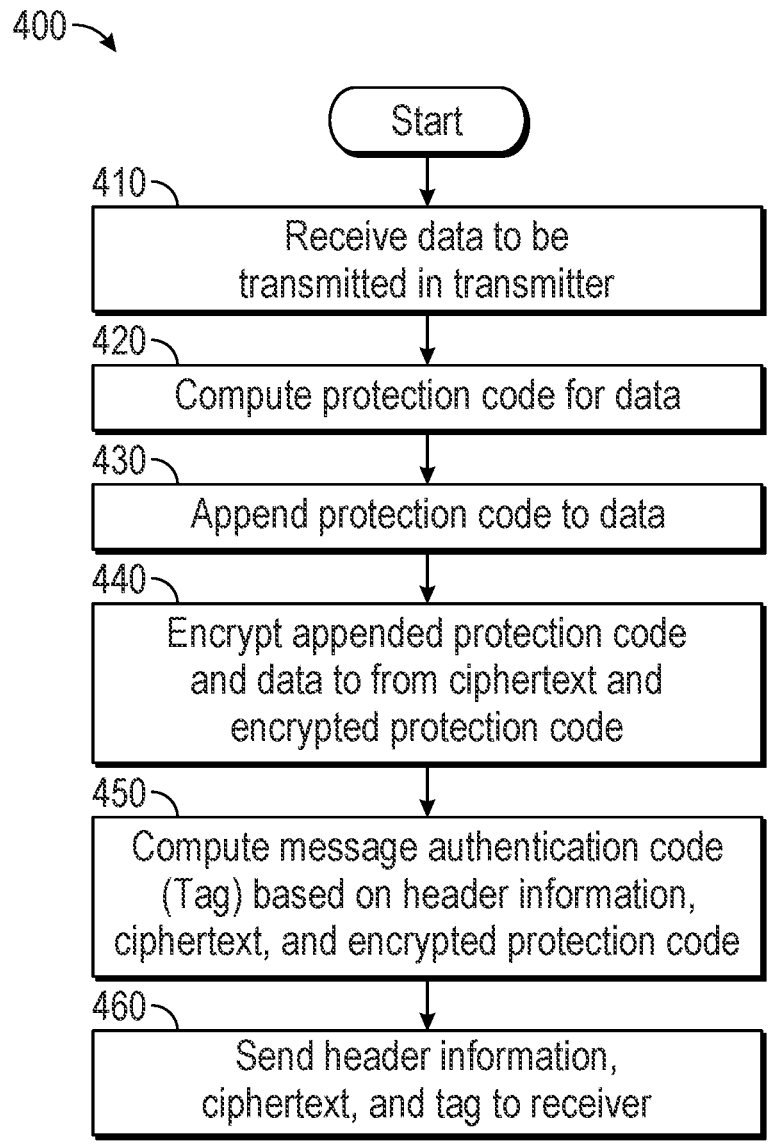
FIG. 4 is a flow diagram of a method in accordance with an embodiment.

Referring now to FIG. 4, shown is a flow diagram of a method in accordance with an embodiment. More specifically, method 400 is a method for providing link IDE measures to data to be transmitted from a transmitter. In one embodiment, method 400 may be performed by hardware circuitry such as IDE circuit 200 of FIG. 2. Of course, in other embodiments method 400 may be executed by other hardware circuitry, alone or in combination with firmware and/or software.

In any case, method 400 begins by receiving data to be transmitted (block 410). Then at block 420 a protection code may be computed for the data. In one example, incoming plain text data can be protected with a CRC. Then at block 430 this protection code, e.g. plain text CRC, may be appended to the data (still in plain text form at this point). Then at block 440 the concatenated information (data and protection code) may be encrypted. More specifically, the plain text data may be encrypted to form cipher text and the protection code may be encrypted to form an encrypted protection code.

Still with reference to FIG. 4, next control passes to block 450 where a MAC (tag) may be computed based on header information, the cipher text, and the encrypted protection code. Thereafter at block 460 the header information, the cipher text, and the tag may be sent from the transmitter to a receiver, e.g., via a given link. Note that with embodiments herein, the protection code is not sent, either in its plain text or encrypted form. As such, IDE protection may be provided while reducing the amount of information to be sent across a link. Understand while shown at this high level in the embodiment of FIG. 4, many variations and alternatives are possible.

Figure 5:
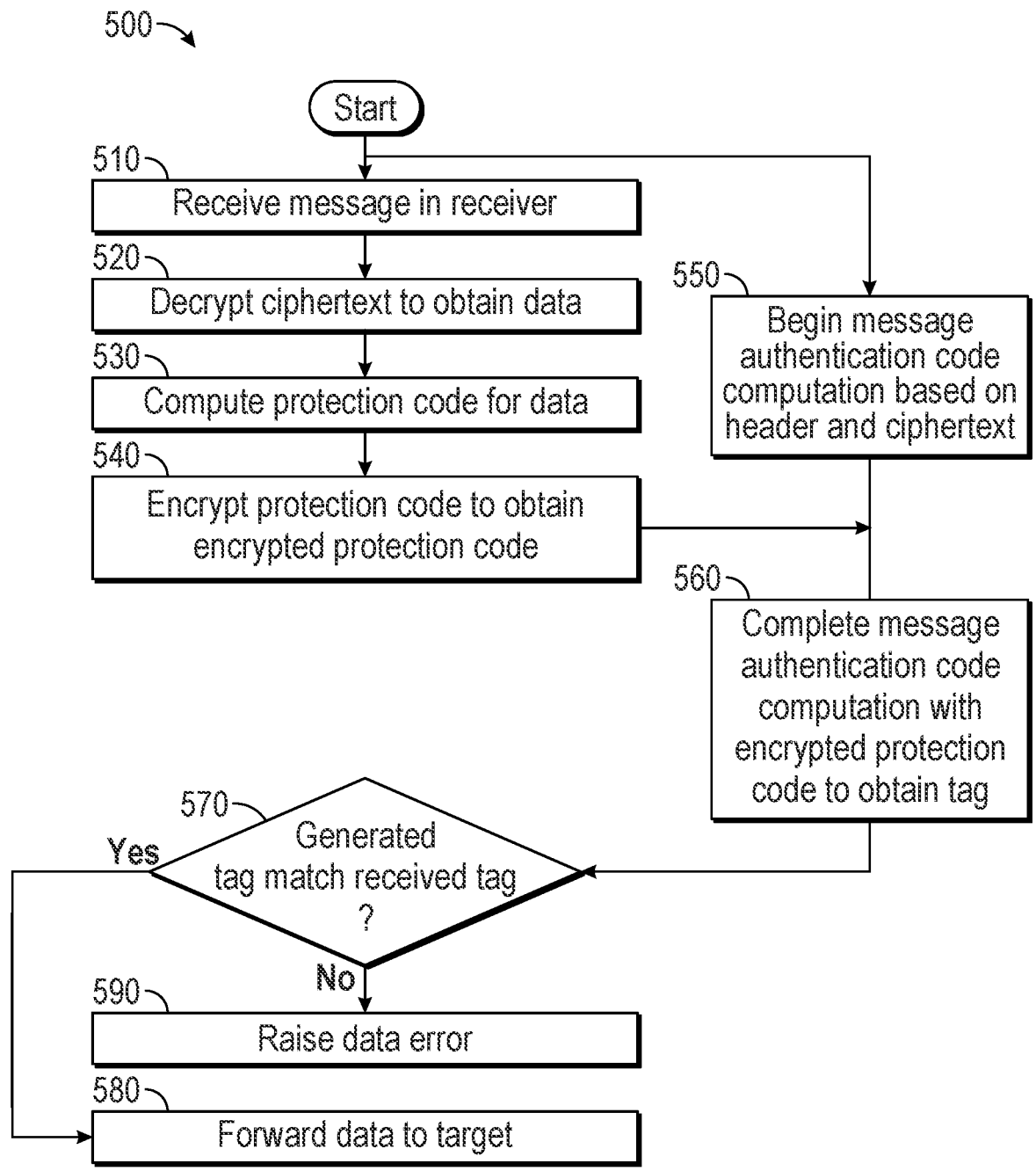
FIG. 5 is a flow diagram of a method in accordance with another embodiment.

Referring now to FIG. 5, shown is a flow diagram of a method in accordance with another embodiment. More specifically, method 500 is a method for providing link IDE measures to data received in a receiver. In one embodiment, method 500 may be performed by hardware circuitry such as IDE circuit 300 of FIG. 3. Of course, in other embodiments method 500 may be executed by other hardware circuitry, alone or in combination with firmware and/or software.

Method 500 begins by receiving a message in the receiver (block 510). This message may be received in a physical circuit of the receiver via a link. Next at block 520 cipher text of the message may be decrypted to obtain plain text data. Then at block 530 a protection code for this plain text data may be computed. That is, as the received message does not include it, the protection code is generated in the receiver itself. Thereafter at block 540 the protection code may be encrypted to obtain an encrypted protection code.

Still with reference to FIG. 5 either in parallel with the above-described operations or when the above operations have completed, MAC computation may occur. More specifically as shown at block 550 it is possible to begin the MAC computation based on the received header and cipher text, even prior to the encrypted protection code being available. In this example, after this initial MAC computation, at block 560 MAC computation may be completed with the encrypted protection code. Thus a resulting tag is generated.

Next, at diamond 570 it is determined whether the generated tag (or MAC) matches the received tag. If so, a received message is valid and control passes to block 580 where the data may be forwarded to a target entity, such as may be identified within the header information. Otherwise should the generated tag and receives tag not match, control passes to block 590 where a data error is raised. In cases where an error correction mechanism is used, it may be possible to try to correct the error. In other cases, the erroneous message may be dropped, and a replay request may be sent back to the transmitter. Or a fatal error may be triggered. Understand while shown at this high level in the embodiment of FIG. 5, many variations and alternatives are possible.

Figure 6A:
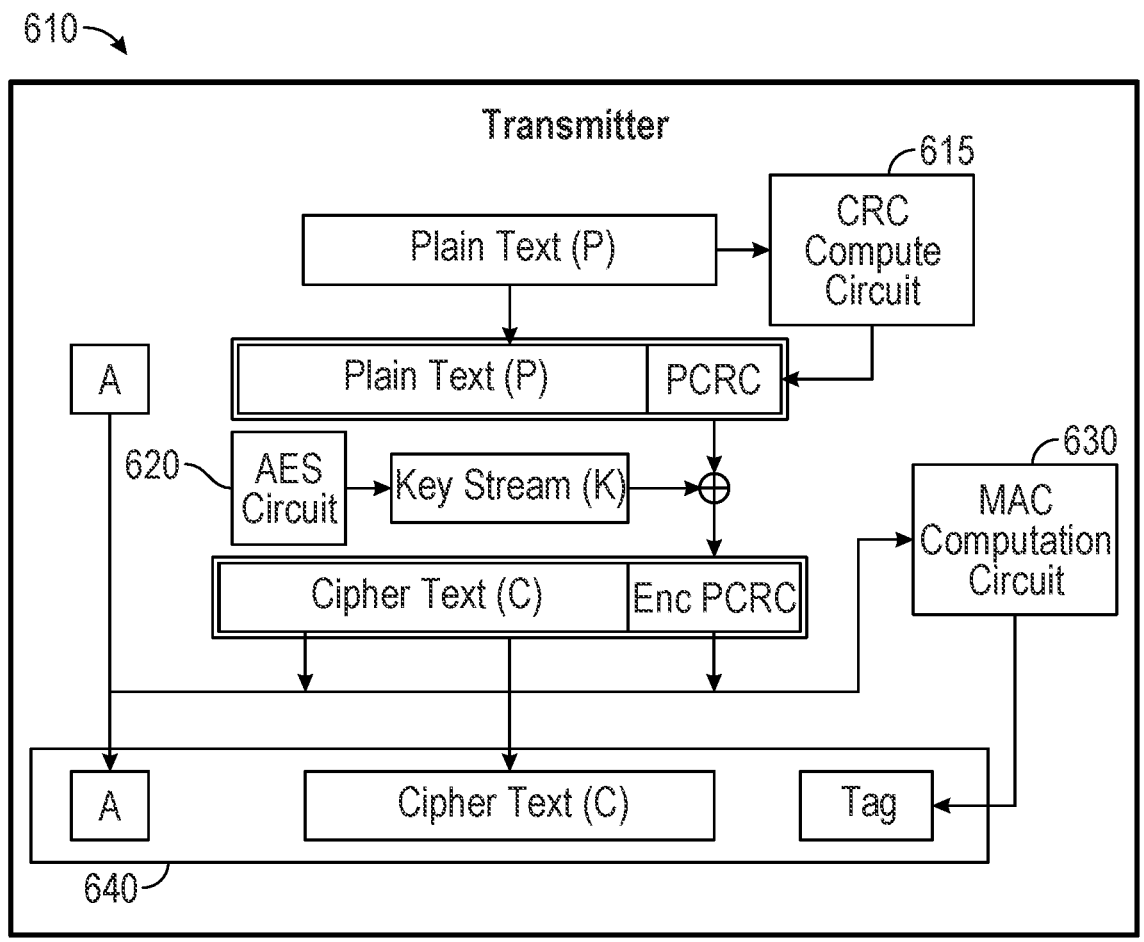
FIGS. 6A-6B are diagrams illustrating a transmitter and a receiver and corresponding data flows in accordance with an embodiment.
Figure 6B:
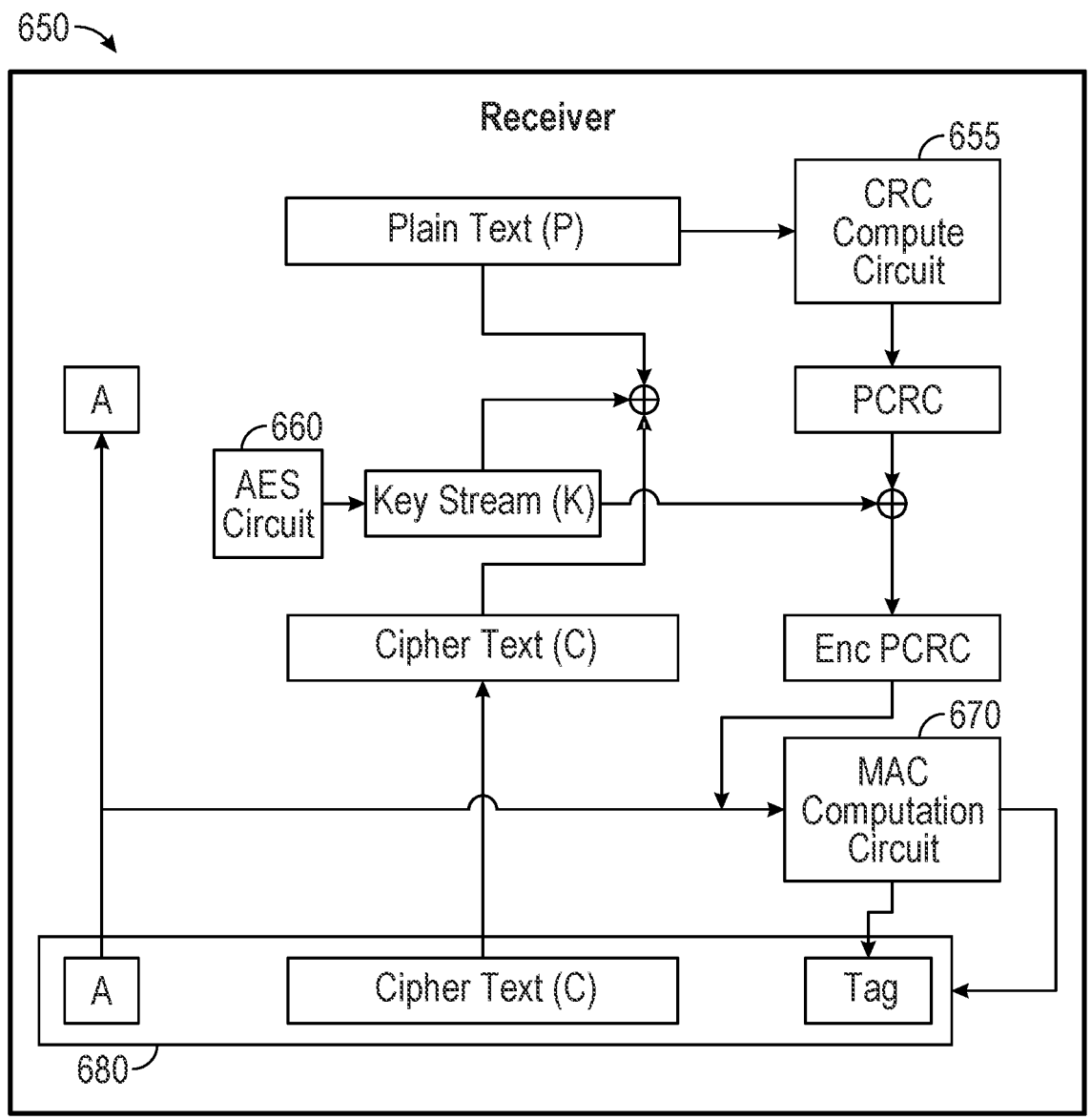

Referring now to FIGS. 6A and 6B, shown are block diagrams representing data flows through a transmitter and a receiver, respectively, in accordance with an embodiment. More specifically, FIG. 6A shows details of circuitry within a transmitter 610 and a flow of data through the transmitter. As shown, transmitter 610 includes a protection circuit implemented as a CRC compute circuit 615, a cryptographic circuit implemented as an AES circuit 620, and a message authentication circuit implemented as a MAC computation circuit 630.

In the high level of FIG. 6A, some plain text content (P) is to be encrypted prior to transmission. Transmitter 610 computes protection bits such as plain text CRC (pCRC) (or parity or ECC) on this data. This pCRC is appended to the plain text to create content used for crypto processing. In an embodiment, this crypto processing may be via an AES Galois Counter Mode (GCM) such that plain text is encrypted using an AES-CTR mode, which involves an XOR of an AES keystream (K) with the plain-text|pCRC to generate cipher text|enc pCRC. In turn, a MAC computation is performed on the encrypted content including the encrypted pCRC. Any additional authentication only data (such as a header shown as A in FIG. 6A) are also fed into MAC computation circuit 630 to generate the tag. Note that as shown, in a message 640, the pCRC is not transmitted on the link. As such thus there is no additional bandwidth overhead for providing AES engine robustness protection. For some communication protocols (for example a CXL cache/mem protocol), there may be no spare bits available to send the encrypted pCRC on the link, avoiding changes to a protocol definition or standard to make available such bits.

Note that this transmit-based operation (and a receive-based operation described in FIG. 6B), may be selectively enabled, e.g., according to a setting in one or more configuration registers. In a CXL implementation, this encrypted pCRC mechanism can be supported to provide robustness against hard and soft faults internal to encryption and decryption engines. This encrypted pCRC may thus be integrated into a MAC check mechanism, does not consume incremental link bandwidth, and can be implemented without adding significant incremental latency. Such pCRC can be enabled by default, such as for a CXL.cachemem protocol and/or can be optionally enabled, e.g., for a CXL.io protocol.

Referring now to FIG. 6B, shown are details of circuitry within a receiver 650 and a flow of data through the receiver. As shown, receiver 650 includes a protection circuit implemented as a CRC compute circuit 655, a cryptographic circuit implemented as an AES circuit 660, and a message authentication circuit implemented as a MAC computation circuit 670.

Receiver 650 receives a message 680 having header information, cipher text, and a tag. The cipher text is provided to AES circuit 660, which decrypts the cipher text using key stream (K) to result in plain text (P), which is provided to CRC compute circuit 655 to generate a pCRC, which is then encrypted, e.g., using AES-CTR mode.

In some cases, MAC computation circuit 670 may in parallel start MAC computation based on header A and cipher text C. MAC computation may then be finalized with the last bits of information from the encrypted pCRC. In any event as shown, the received header information, the cipher text and the encrypted pCRC is provided to MAC computation circuit 670, which generates a computed tag. This computed tag may be compared against the received tag to confirm data integrity. Although shown at this high level in the embodiment of FIGS. 6A and 6B, variations and alternatives are possible.

Figure 7A:
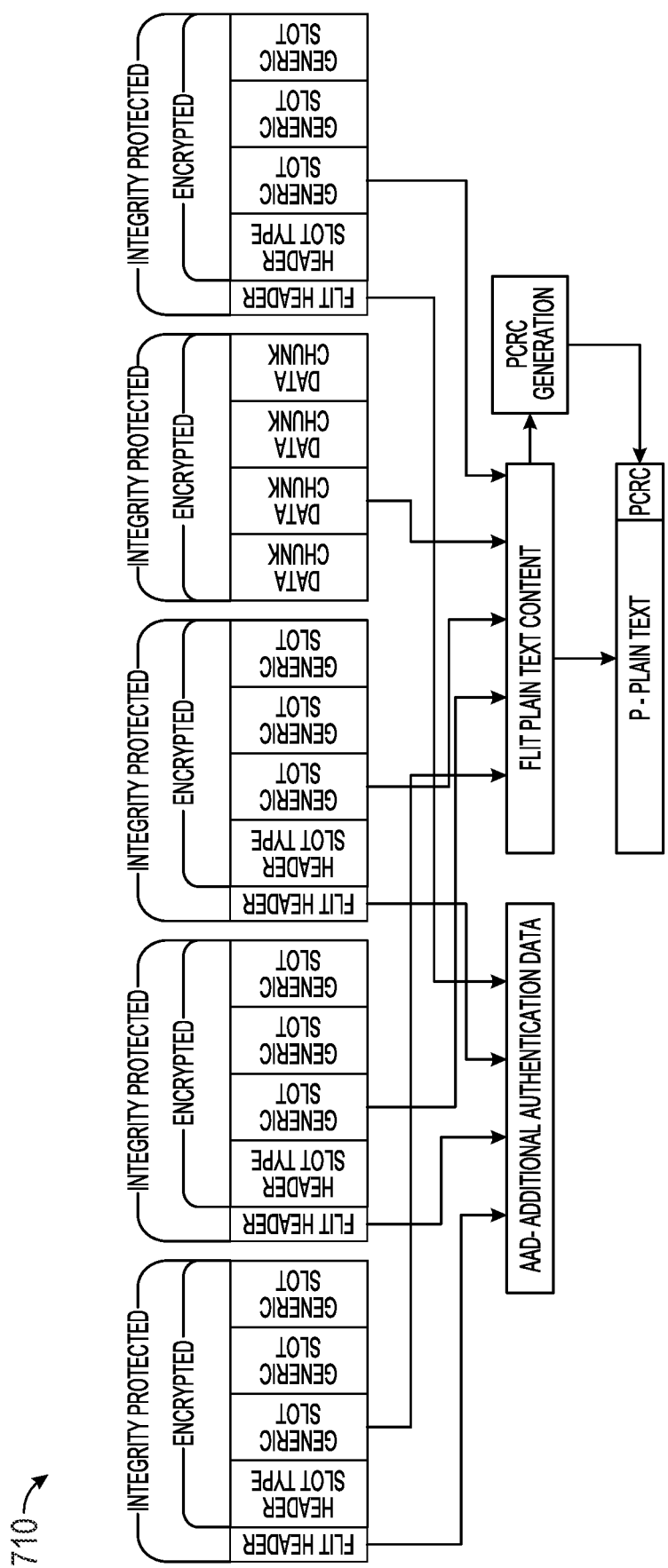
FIGS. 7A-7C are block diagrams of data formats in accordance with embodiments.
Figure 7B:
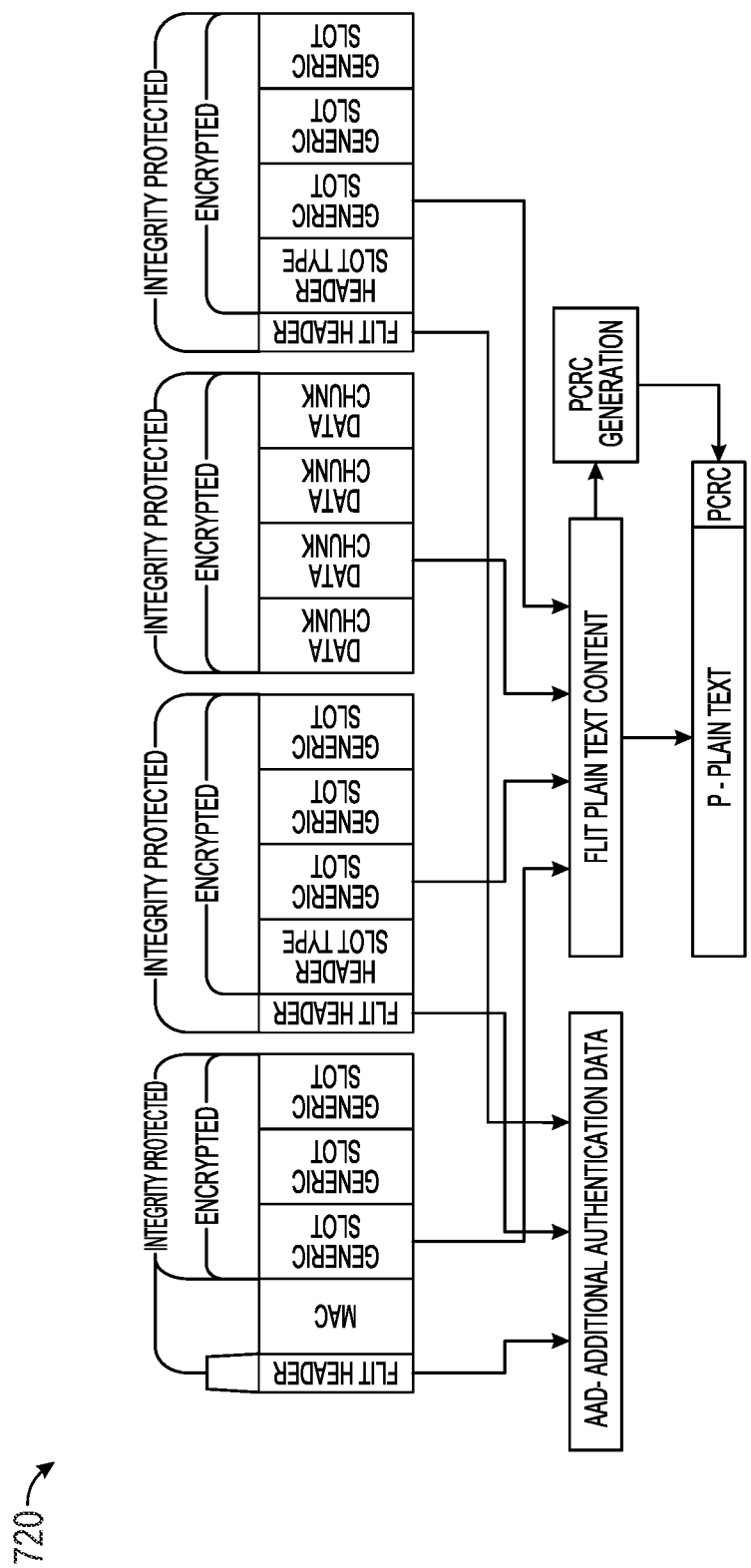
Figure 7C:
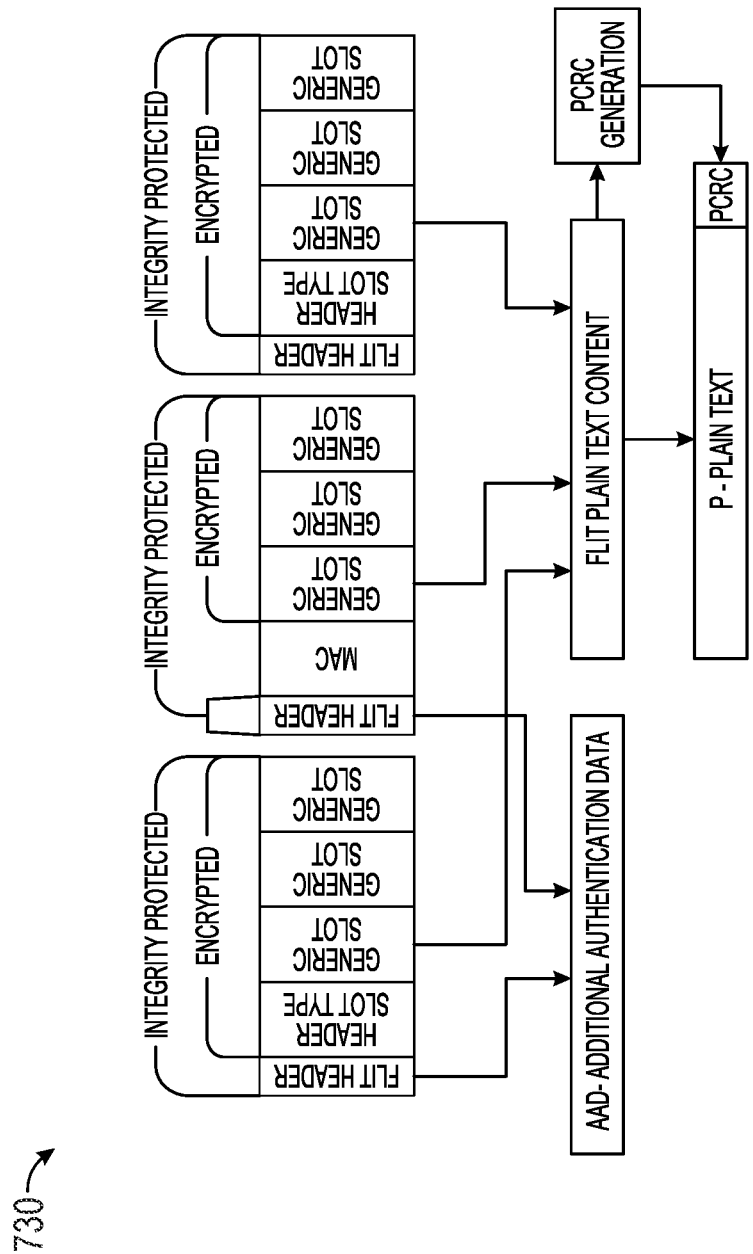

In an embodiment for a CXL implementation, data packets may include support for encryption and data protection as described herein. Referring now to FIGS. 7A-7C, shown are block diagrams of data formats in accordance with embodiments. Starting with FIG. 7A, a data format 710 is shown in which message contents include header information and slot information, along with data chunks. As shown, each flit may include a header and multiple slots, each of which may be of a header slot type, a generic slot or and/or a data chunk. Note that the individual slots of the flits are both encrypted and integrity protected, while the flit headers are only integrity protected. As shown, these flit headers collectively form additional authentication data (AAD) which, along with flit plain text content and a pCRC, can be used to generate a MAC in the form of a tag. More specifically, the plain text and pCRC first may be encrypted prior to generation of the MAC using such encrypted information and the AAD.

In FIG. 7B, a similar data format 720 is presented. Note here that in this instance, a first flit includes a MAC, instead of a header slot type. Similarly, in FIG. 7C, another data format 730 is presented. Note here that in data format 730, a second flit includes a MAC, and the remaining flits all include a header slot type and generic slots.

In one embodiment, an encrypted pCRC mechanism may implement a polynomial with the coefficient 0x1EDC6F41 to be used for pCRC computation. In this embodiment, pCRC computation may begin with an initial value of 0xFFFFFFFF. In an embodiment, pCRC is computed across all the bytes of plain text in the aggregated flits that are part of a given MAC epoch. This pCRC calculation may begin with bit0byte0 of flit plain text content and sequentially include bits 0-7 for each byte of the flit contents that are mapped to the plain text. After accumulating a 32-bit value across the flit contents, the pCRC value can be finalized by taking the one's complement of the bits of the accumulated value to obtain pCRC [31:0].

Figure 8:
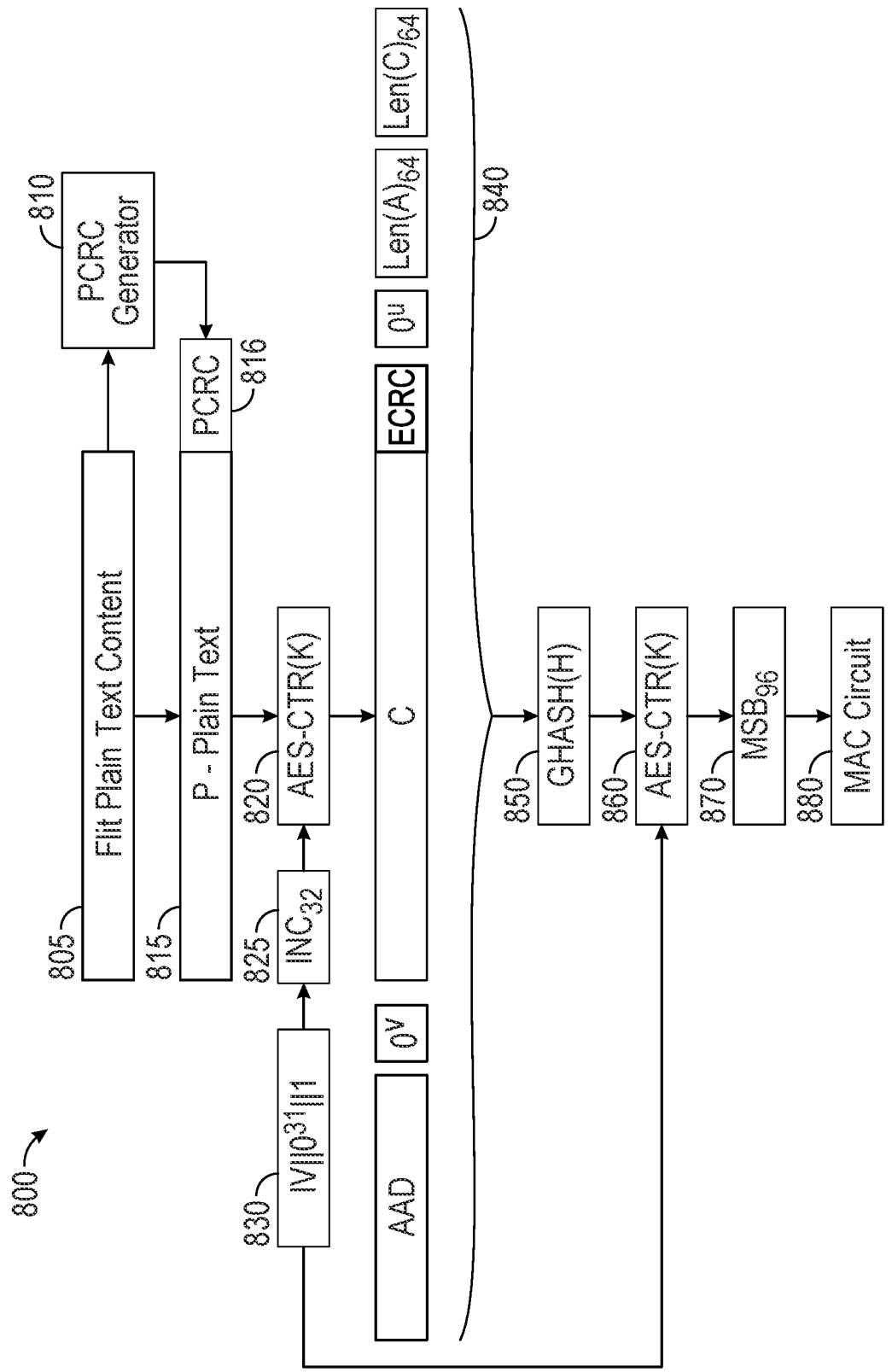
FIG. 8 is a data flow diagram of operations on a transmit side in accordance with an embodiment.

Referring now to FIG. 8, shown is a data flow diagram of operations on a transmit side in accordance with an embodiment. In this arrangement, a transmitter 800 receives flit plain text content 805 and generates a pCRC 816 within a CRC generator 810. As shown, the pCRC value is appended to the end of the aggregated flit plain text content, encrypted and included in the MAC computation, but this encrypted pCRC is not transmitted across a link, avoiding impact on a communication protocol. Thus when pCRC is enabled (e.g., according to a configuration register setting), a 32-bit pCRC is appended to the end of aggregated flit content to contribute to a final plain text value that is integrity protected.

The resulting plain text 815 and CRC 816 is provided to an AES block 820 that further receives a key stream input formed of a concatenation data 830 of an initialization value (IV) and an initial counter value 825. As shown, resulting cipher text generated in AES block 820, along with the encrypted CRC, the AAD, and additional information in data packet 840 is provided to a hash generator 850, which generates a hash, provided to another AES block 860. This resulting encrypted information, namely the most significant 96 bits (block 870) is provided to a MAC circuit 880, which generates a MAC, namely a tag.

Figure 9:
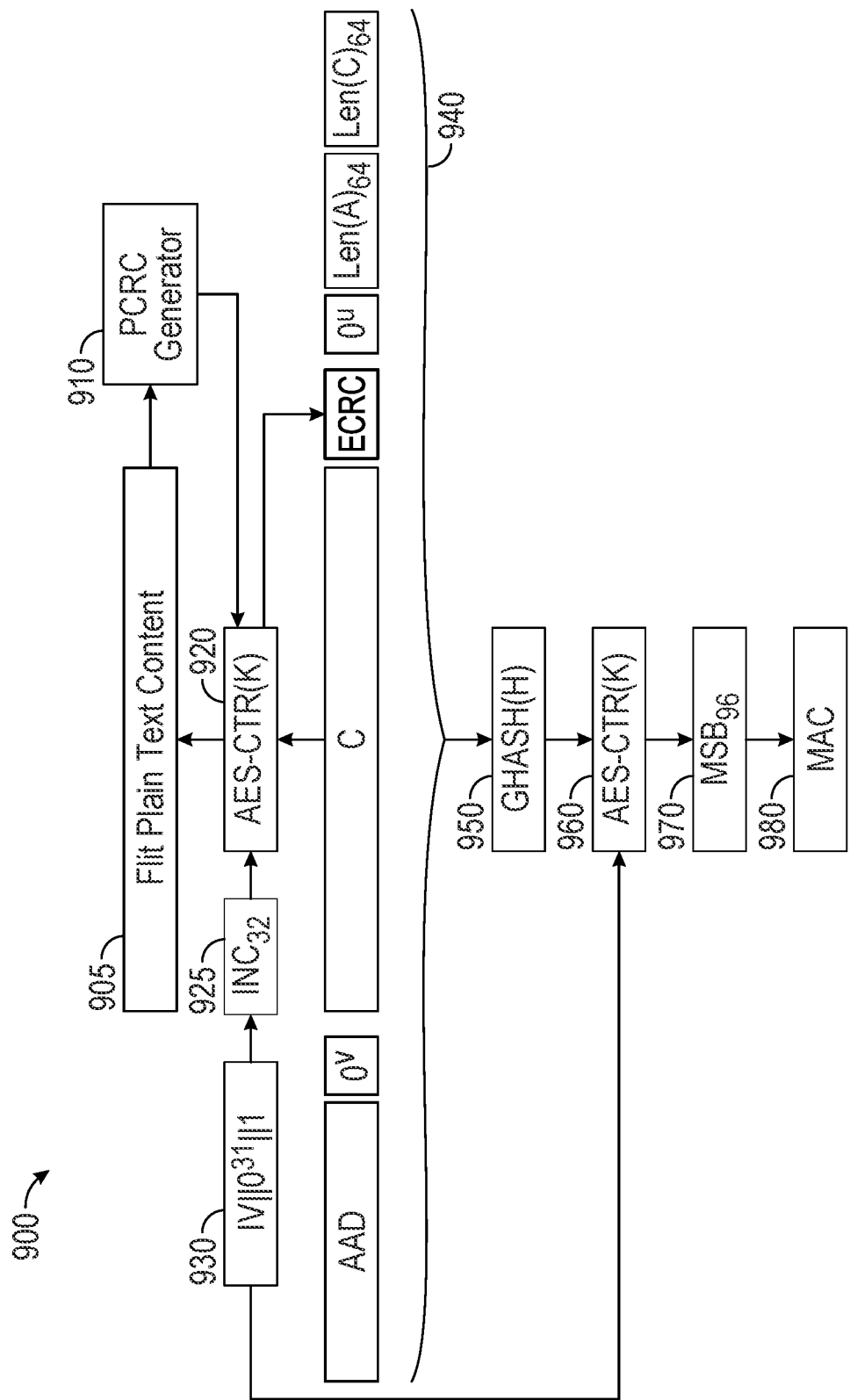
FIG. 9 is a data flow diagram of operations on a receive side in accordance with an embodiment.

Referring now to FIG. 9, shown is a data flow diagram of operations on a receive side in accordance with an embodiment. On the receiver, the pCRC value is recomputed based on received decrypted cipher text. When the last flit of a current MAC epoch has been processed, the accumulated pCRC value is XORed (encrypted) with AES keystream bits that immediately follow the values used for decrypting the received cipher flit. This encrypted pCRC value is appended to the end of the received cipher text for the purposes of MAC computation.

As shown in FIG. 9, a receiver 900 receives a message that includes cipher text and additional authentication data, including header information. After an AES block 920 obtains flit plain text content 905, a CRC is generated within a CRC generator 910. As shown, this pCRC value is provided back to AES block 920 to be encrypted using a key stream formed of a concatenation data 930 of an IV and an initial counter value 925. The cipher text, along with the encrypted CRC, the AAD, and additional information in data packet 940 is provided to a hash generator 950, which generates a hash, provided to another AES block 960. This resulting encrypted information, namely the most significant 96 bits (block 970), is provided to a MAC circuit 980, which generates a MAC tag, to be used for a comparison with a received tag.

Figure 10:
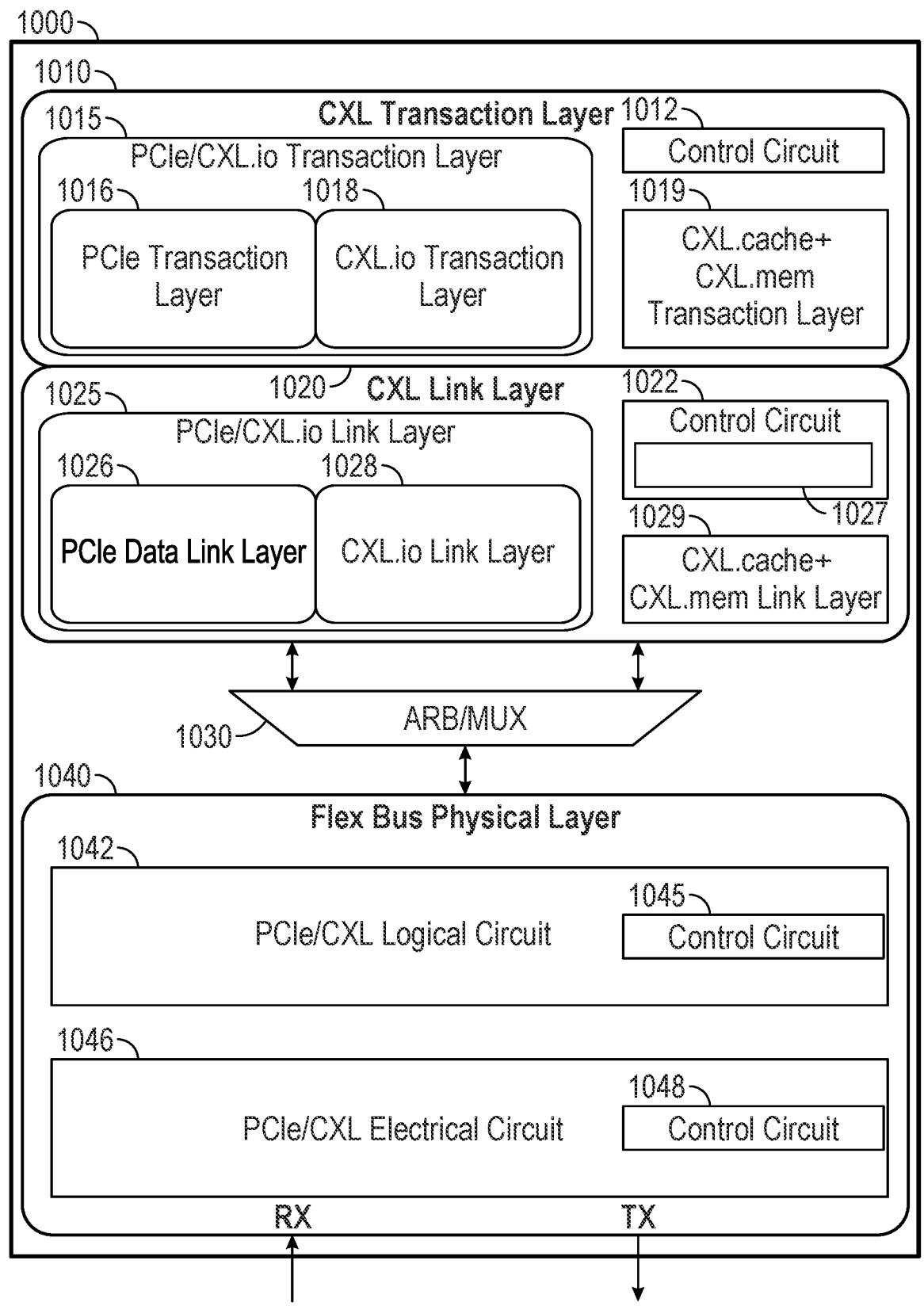
FIG. 10 is a block diagram of an interface circuit in accordance with an embodiment.

Referring now to FIG. 10, shown is a block diagram of an interface circuit in accordance with an embodiment. More specifically as shown in FIG. 10, interface circuit 1000 is for interfacing a given device such as a transmitter and/or receiver to a link. In the embodiment shown in FIG. 10, interface circuit 1000 is a CXL interface circuit. As shown, CXL interface circuit 1000 includes a transaction layer 1010, a link layer 1020, and a physical layer 1040. With reference to CXL transaction layer 1010, various components are included to enable transaction layer processing for PCIe/CXL.io communications and CXL.cache and CXL.memory transactions. More particularly, a PCIe/CXL.io transaction layer 1015 includes a control circuit 1012, which may perform various transaction layer control operations. In addition, transaction layer 1010 further includes a PCIe transaction layer 1016 and additional circuitry 1018 for handling enhancements to PCIe transaction layer 1016 for handling CXL.io transactions. In turn, CXL.cache and CXL.memory transaction layer 1019 may perform transaction layer processing for these protocols.

With reference to CXL link layer 1020, various components are included to enable link layer processing for PCIe/CXL.io communications and CXL.cache and CXL.memory transactions. More particularly, a PCIe/CXL.io link layer 1025 includes a control circuit 1022. In embodiments herein, control circuit 1022 may configure the various components and/or itself perform link IDE operations, including providing both data integrity and encryption/decryption as described herein.

In an embodiment, control circuit 1022 may include or be coupled to one or more configuration registers 1027. Such configuration registers may include one or more fields to control various features including a pCRC mechanism as described herein. In a particular embodiment, configuration registers 1027 may include a CXL IDE defeature register, which may include a pCRC enable/disable indicator. In one implementation, a logic "1" value may disable enhancing the MAC generation with plaintext CRC, and when reset to a logic "0" value, this pCRC mechanism may be enabled by default.

As further shown, link layer 1020 also includes a PCIe data link layer 1026 and additional circuitry 1028 for handling enhancements to PCIe data link layer 1026 for handling CXL.io transactions. In turn, CXL.cache and CXL.memory link layer 1029 may perform link layer processing for these protocols.

With further reference to FIG. 10, link layer 1020 is coupled to an arbiter/multiplexer 1030 that is to receive incoming data streams from link layer 1020 and select a data stream (or portion thereof) for communication to a physical layer 1040.

In an embodiment, physical layer 1040 may be a physical layer to further process incoming data packets for communication on a physical link, which in an embodiment may be a flex bus. As illustrated, physical layer 1040 includes a PCIe/CXL logical circuit 1042 and a PCIe/CXL electrical circuit 1046. As seen, these circuits include respective control circuits 1045, 1048 to control processing within physical layer 1040. After all such processing is completed, outgoing transaction layer data packets may be communicated on the link. Similarly, incoming transaction layer data packets may be received within physical layer 1040 and processed within the communication stack of interface circuit 1000. Understand while shown at this high level in the embodiment of FIG. 10, many variations and alternatives are possible.

Figure 11:
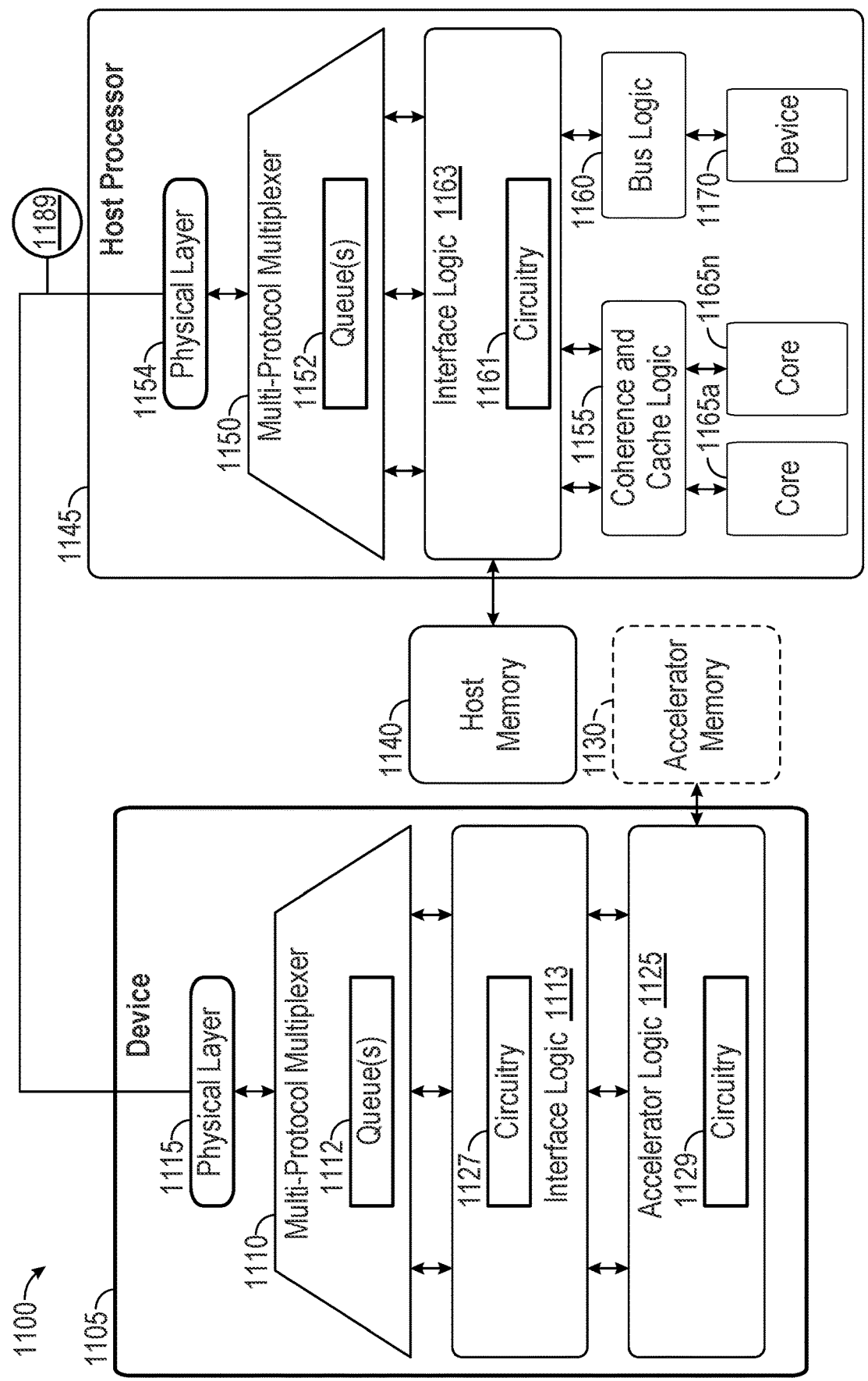
FIG. 11 is a block diagram of a system in accordance with an embodiment.

FIG. 11 is a block diagram of a system 1100 in accordance with an embodiment. As shown in FIG. 11, a device 1105 may be an accelerator or processor device coupled to a host processor 1145 via an interconnect 1189, which may be single interconnect, bus, trace, and so forth. Device 1105 and host processor 1145 may communicate over link 1189 to enable data and messages to pass therebetween. In some embodiments, link 1189 may be operable to support multiple protocols and communication of data and messages via the multiple interconnect protocols, including a CXL protocol as described herein. For example, link 1189 may support various interconnect protocols, including a non-coherent interconnect protocol, a coherent interconnect protocol, and a memory interconnect protocol. Non-limiting examples of supported interconnect protocols may include PCI, PCIe, USB, IDI, IOSF, SMI, SMI3, SATA, CXL.io, CXL.cache, and CXL.mem, and/or the like.

In embodiments, device 1105 may include accelerator logic 1125 including circuitry 1129. In some instances, accelerator logic 1125 and circuitry 1129 may provide processing and memory capabilities. Examples of device 1105 may include producer-consumer devices such as a graphics or other specialized accelerator, producer-consumer plus devices, software-assisted device memory devices, autonomous device memory devices, and giant cache devices. In some cases, accelerator logic 1125 may couple to an optional accelerator memory 1130. Accelerator logic 1125 and circuitry 1129 may provide the processing and memory capabilities based on the device. For example, accelerator logic 1125 and circuitry 1129 may communicate using, for example, a coherent interconnect protocol for various functions, such as coherent requests and memory flows with host processor 1145 via interface logic 1113 and circuitry 1127. Interface logic 1113 and circuitry 1127 may determine an interconnect protocol based on the messages and data for communication. Understand that with embodiments herein, circuitry 1127 may include link IDE circuitry to perform both data integrity and data encryption/decryption as described herein. In some embodiments, interface logic 1113 may be coupled to a multi-protocol multiplexer 1110 having one or more protocol queues 1112 to send and receive messages and data with host processor 1145. Protocol queue 1112 may be protocol specific such that each interconnect protocol may be associated with a particular protocol queue. Multiplexer 1110 may also implement arbitration circuitry to arbitrate between communications of different protocols and provide selected communications to a physical layer 1115.

In various embodiments, host processor 1145 may be a main processor such as a CPU. Host processor 1145 may be coupled to a host memory 1140 and may include coherence logic (or coherence and cache logic) 1155, which may include a cache hierarchy. Coherence logic 1155 may communicate using various interconnects with interface logic 1163 including circuitry 1161 and one or more cores 1165*a-n*. In some embodiments, coherence logic 1155 may enable communication via one or more of a coherent interconnect protocol and a memory interconnect protocol.

In various embodiments, host processor 1140 may include a device 1170 to communicate with a bus logic 1160 over an interconnect. In some embodiments, device 1170 may be an I/O device, such as a PCIe I/O device. In other cases, one or more external devices such as PCIe devices may couple to bus logic 1170.

In embodiments, host processor 1145 may include interface logic 1163 and circuitry 1161 to enable multi-protocol communication between the components of host processor 1145 and device 1105. Interface logic 1163 and circuitry 1161 may process and enable communication of messages and data between host processor 1145 and device 1105 in accordance with one or more interconnect protocols, e.g., a non-coherent interconnect protocol, a coherent interconnect, protocol, and a memory interconnect protocol, dynamically. For example, interface logic 1163 and circuitry 1161 may determine a message type for each message and determine which interconnect protocol of a plurality of interconnect protocols to process each of the messages. Different interconnect protocols may be utilized to process the messages. In addition, circuitry 1161 may include link IDE circuitry to perform both data integrity and data encryption/decryption as described herein.

In some embodiments, interface logic 1163 may be coupled to a multi-protocol multiplexer 1150 having one or more protocol queues 1152 to send and receive messages and data with device 1105. Protocol queue 1152 may be protocol specific such that each interconnect protocol may be associated with a particular protocol queue. Multiplexer 1150 may also implement arbitration circuitry to arbitrate between communications of different protocols and provide selected communications to a physical layer 1154.

The following examples pertain to further embodiments.

In one example, an apparatus includes: an integrity circuit to receive data and generate a protection code based at least in part on the data; a cryptographic circuit coupled to the integrity circuit to encrypt the data into encrypted data and encrypt the protection code into an encrypted protection code; a MAC circuit coupled to the cryptographic circuit, the MAC circuit to compute a MAC comprising a tag using header information, the encrypted data, and the encrypted protection code; and an output circuit to send the header information, the encrypted data, and the tag to a receiver via a link.

In an example, the output circuit is to not send the encrypted protection code to the receiver.

In an example, the integrity circuit is to generate the protection code comprising a plain text cyclic redundancy checksum.

In an example, apparatus comprises a configuration register having a first indicator, where when the first indicator has a first value, the integrity circuit is to generate the protection code, and when the first indicator has a second value, the integrity circuit is to not generate the protection code.

In an example, the apparatus is to append the protection code to plain text comprising the data, and encrypt the plain text into cipher text and encrypt the appended protection code into the encrypted protection code.

In an example, the integrity circuit is to accumulate a protection value from a plurality of flits of the data and a polynomial having a predetermined coefficient, and generate the protection code as a ones complement of the accumulated protection value.

In an example, the apparatus further comprises a decryption circuit to decrypt cipher text of a message into plain text, the message further comprising a header and a MAC tag.

In an example, the apparatus further comprises a second integrity circuit to generate a plain text protection code from the plain text.

In an example, the apparatus further comprises a second cryptographic circuit to encrypt the plain text protection code into an encrypted protection code.

In an example, the apparatus further comprises a second MAC circuit to generate a MAC tag from the cipher text, the header, and the encrypted protection code.

In an example, the apparatus further comprises a validation circuit to validate the message in response to a match between the tag and the MAC tag.

In another example, a method comprises: receiving, in a receiver, a message having a header, a tag, and cipher text; decrypting, in the receiver, the cipher text to obtain plain text, computing a protection code for the plain text, and encrypting the protection code to obtain an encrypted protection code; computing, in the receiver, a MAC using the header, the cipher text and the encrypted protection code; and validating the message in response to the tag matching the MAC, and sending the plain text to a destination identified in the header.

In an example, the method further comprises: beginning computing the MAC using the header and the cipher text; and completing computing the MAC further using the encrypted protection code.

In an example, the method further comprises, in response to a mismatch between the tag and the MAC, signaling a data error in the message.

In an example, receiving the message comprises receiving the message having the header, the tag and the cipher text and not having a protection code.

In an example, computing the protection code comprises using a polynomial having a coefficient of 0x1EDC6F41 and the plain text comprises a plurality of flits of a MAC epoch.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In yet another example, a system includes: at least one core; an interconnect coupled to the at least one core; a downstream port coupled to the interconnect; an upstream port coupled to the downstream port, and a device coupled to the upstream port. In an example, the downstream port comprises: a first link IDE circuit to receive plain text, generate a plain text protection code from the plain text, encrypt the plain text into cipher text, encrypt the plain text protection code into an encrypted protection code, generate a MAC from additional authentication data, the cipher text, and the encrypted protection code; and an output circuit coupled to the first link IDE circuit to output a message having the additional authentication data, the cipher text, and the MAC, the message not having the encrypted protection code. In an example, the upstream port comprises: an input circuit to receive the message having the additional authentication data, the cipher text, and the MAC, the message not having the encrypted protection code; and a second link IDE circuit coupled to the input circuit, the second link IDE circuit to decrypt the cipher text into the plain text, generate the plain text protection code from the plain text, encrypt the plain text protection code into the encrypted protection code, generate the MAC from the additional authentication data, the cipher text, and the encrypted protection code, and verify whether the generated MAC matches the MAC received in the message. The device may receive at least the plain text when the generated MAC matches the MAC received in the message.

In an example, the first link IDE circuit is to accumulate a protection value from a plurality of flits and a polynomial having a predetermined coefficient, and generate the protection code as a ones complement of the accumulated protection value.

In an example, the downstream port is coupled to the upstream port via a CXL interconnect, where the upstream port is to send the message to the downstream port via the CXL interconnect according to one of a CXL.memory communication protocol, a CXL.cache communication protocol, and a CXL.io communication protocol.

In an example, the system further comprises a defeature register having a first indicator, wherein when the first indicator has a first value, the first link IDE circuit is to generate the plain text protection code, and when the first indicator has a second value, the first link IDE circuit is to not generate the plain text protection code.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   link layer circuitry to receive data comprising at least one of first information of a first interconnect protocol or second information of a second interconnect protocol;
   a multi-protocol multiplexer coupled to the link layer circuitry, the multi-protocol multiplexer to receive the data from the link layer circuitry and direct the data to physical layer circuitry; and
   the physical layer circuitry coupled to the multi-protocol multiplexer, wherein the physical layer circuitry is to receive the data from the multi-protocol multiplexer and transmit at least one packet on a link,
   wherein the apparatus is configurable to:
   aggregate a plurality of flits of the data into aggregated data of a message authentication code (MAC) epoch, each of the plurality of flits comprising a header and a plurality of slots;
   generate a plaintext cyclic redundancy checksum (pCRC) based on the aggregated data of the MAC epoch;
   encrypt plaintext comprising the aggregated data and the pCRC into encrypted plaintext, the encrypted plaintext comprising encrypted aggregated data and an encrypted pCRC;
   compute a MAC using header information of the plurality of flits and the encrypted plaintext; and
   transmit the header information, the encrypted aggregated data, and the MAC, and not the encrypted pCRC via the physical layer circuitry on the link.

2. The apparatus of claim 1, further comprising a register having a first indicator, wherein when the first indicator has a first value, the apparatus is to generate the pCRC, and when the first indicator has a second value, the apparatus is to not generate the pCRC.

3. The apparatus of claim 1, wherein the apparatus is to append the pCRC to the aggregated data, and encrypt the plaintext into cipher text and encrypt the appended pCRC into the encrypted pCRC.

4. The apparatus of claim 1, wherein the apparatus is to accumulate a protection value from the plurality of flits of the data and a polynomial having a predetermined coefficient, and generate the pCRC as a ones complement of the accumulated protection value.

5. The apparatus of claim 4, wherein the apparatus is to accumulate the protection value from the polynomial having the predetermined coefficient comprising 1EDC 6F41h.

6. The apparatus of claim 1, wherein the apparatus is to aggregate the data of the plurality of flits of a CXL.mem protocol.

7. The apparatus of claim 1, wherein the apparatus is to encrypt a first plurality of slots of at least a first flit of the plurality of flits.

8. The apparatus of claim 7, wherein the apparatus is to integrity protect a flit header of at least the first flit and the encrypted first plurality of slots of the first flit.

9. The apparatus of claim 1, wherein the apparatus is to generate the MAC comprising 96 bits.

10. The apparatus of claim 1, wherein the apparatus is to include the MAC in one of the plurality of flits.

11. The apparatus of claim 1, wherein the apparatus is to transmit the MAC unencrypted and integrity protected.

12. The apparatus of claim 1, wherein the apparatus is to generate a hash of the header information and at least some at the encrypted plaintext.

13. The apparatus of claim 12, wherein the apparatus is to encrypt the hash and generate the MAC from the encrypted hash.

14. A method comprising:
   aggregating, in integrity and data encryption (IDE) circuitry of an interface, a plurality of flits of data into aggregated data of a message authentication code (MAC) epoch, each of the plurality of flits comprising a header and a plurality of slots;
   generating, in the IDE circuitry, a plaintext cyclic redundancy checksum (pCRC) based at least in part on the aggregated data;
   encrypting, in the IDE circuitry, plaintext comprising the aggregated data and the pCRC into encrypted plaintext, the encrypted plaintext comprising encrypted aggregated data and an encrypted pCRC;

computing, in the IDE circuitry, a MAC using header information of the plurality of flits and the encrypted plaintext; and transmitting, via a physical layer circuit, the header information, the encrypted aggregated data, and the MAC, and not the encrypted pCRC on a link.

15. The method of claim 14, further comprising:

appending the pCRC to the aggregated data; and encrypting the plaintext into cipher text and encrypting the appended pCRC into the encrypted pCRC.

16. The method of claim 15, further comprising:

encrypting the plaintext into the cipher text and encrypting the appended pCRC into the encrypted pCRC via Advanced Encryption Standard-Galois Counter Mode encryption.

17. A system comprising:

a host processor having at least one core and an interface circuit, the interface circuit comprising:
  link layer circuitry to receive data comprising at least one of first information of a first interconnect protocol or second information of a second interconnect protocol;
  a multi-protocol multiplexer coupled to the link layer circuitry, the multi-protocol multiplexer to receive the data from the link layer circuitry and direct the data to physical layer circuitry; and
  the physical layer circuitry coupled to the multi-protocol multiplexer, wherein the physical layer circuitry is to receive the data from the link layer circuitry and transmit at least one packet on a link, wherein the interface circuit is configurable to:
  aggregate a plurality of flits of the data into aggregated data of a message authentication code (MAC) epoch, each of the plurality of flits comprising a header and a plurality of slots;
  generate a plaintext cyclic redundancy checksum (pCRC) based at least in part on the aggregated data;
  encrypt plaintext comprising the aggregated data and the pCRC into encrypted plaintext, the encrypted plaintext comprising encrypted aggregated data and an encrypted pCRC;
  compute a MAC using header information of the plurality of flits and the encrypted plaintext; and
  transmit the header information, the encrypted aggregated data, and the MAC, and not the encrypted pCRC to an accelerator; and
the accelerator coupled to the host processor.

18. The system of claim 17, wherein the host processor further comprises a register having a first indicator, wherein when the first indicator has a first value, the interface circuit is to generate the pCRC, and when the first indicator has a second value, the interface circuit is to not generate the pCRC.

19. The system of claim 17, wherein the interface circuit is to accumulate a protection value from the plurality of flits of the data and a polynomial having a predetermined coefficient, and generate the pCRC as a ones complement of the accumulated protection value.

* * * * *